(12) United States Patent
Takeda et al.

(10) Patent No.: US 7,117,023 B2
(45) Date of Patent: Oct. 3, 2006

(54) APPARATUS WITH COMMUNICATION FUNCTION, METHOD OF CONTROLLING APPARATUS, AND STORAGE MEDIUM STORING PROGRAM FOR CONTROLLING APPARATUS

(75) Inventors: Tomoyuki Takeda, Ibaraki (JP); Muneki Nakao, Chiba (JP); Naomi Nakamura, Chiba (JP); Koji Okamura, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 730 days.

(21) Appl. No.: 09/977,317

(22) Filed: Oct. 16, 2001

(65) Prior Publication Data

US 2002/0045425 A1 Apr. 18, 2002

(30) Foreign Application Priority Data

Oct. 17, 2000 (JP) ............................ 2000/316509
Sep. 28, 2001 (JP) ............................ 2001/301049

(51) Int. Cl.
*H04M 1/00* (2006.01)
(52) U.S. Cl. .................. 455/574; 455/556.1; 455/572; 455/343.5
(58) Field of Classification Search ................. 455/574, 455/556.1, 41.2, 426.1, 456.4, 528, 556.2, 455/557, 572, 573, 127.5, 343.5, 552.1
See application file for complete search history.

(56) References Cited

U.S. PATENT DOCUMENTS

| | | | | |
|---|---|---|---|---|
| 5,560,021 A | | 9/1996 | Vook et al. .................. | 395/570 |
| 5,720,014 A | | 2/1998 | Ikeda et al. .................. | 395/114 |
| 5,737,707 A | * | 4/1998 | Gaulke et al. ........... | 455/556.1 |
| 6,134,017 A | | 10/2000 | Schlank et al. ............ | 358/1.15 |
| 6,571,103 B1 | * | 5/2003 | Novakov ...................... | 455/464 |
| 6,622,031 B1 | * | 9/2003 | McCleary et al. ........ | 455/575.7 |
| 6,895,220 B1 | * | 5/2005 | Usui ....................... | 455/552.1 |
| 6,895,255 B1 | * | 5/2005 | Bridgelall ................ | 455/552.1 |

OTHER PUBLICATIONS

S. Mattisson, "Low-power considerations in the design of bluetooth", Conference Proceedings Article ISLPED 00, Jul. 26, 2000, pp. 151-154.
Bluetooth Specification Version 1.0B, Core vol. 1, Journal Article; pp. 95-126; Jan. 12, 1999.

* cited by examiner

*Primary Examiner*—Jefferey F. Harold
(74) *Attorney, Agent, or Firm*—Fitzpatrick, Cella, Harper & Scinto

(57) ABSTRACT

Even in an apparatus connected to another apparatus which periodically transmits a command, a mode transition such as transition to a power saving stand-by mode can be performed. A mode change for Bluetooth communications and a mode change in a stand-by state are performed in cooperation with each other to efficiently switch between stand-by modes.

8 Claims, 11 Drawing Sheets

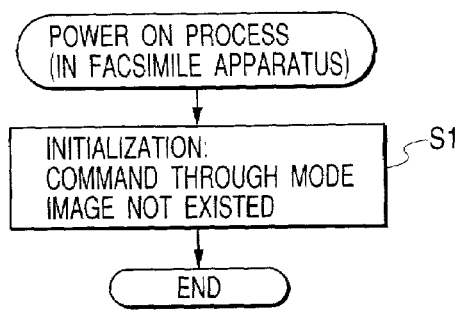
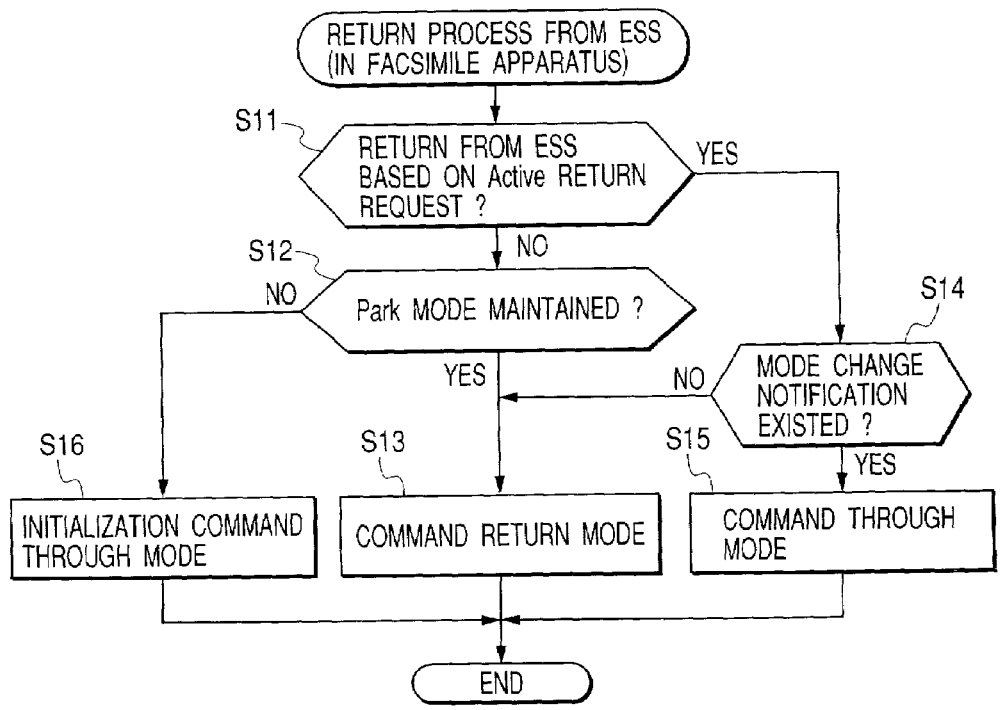

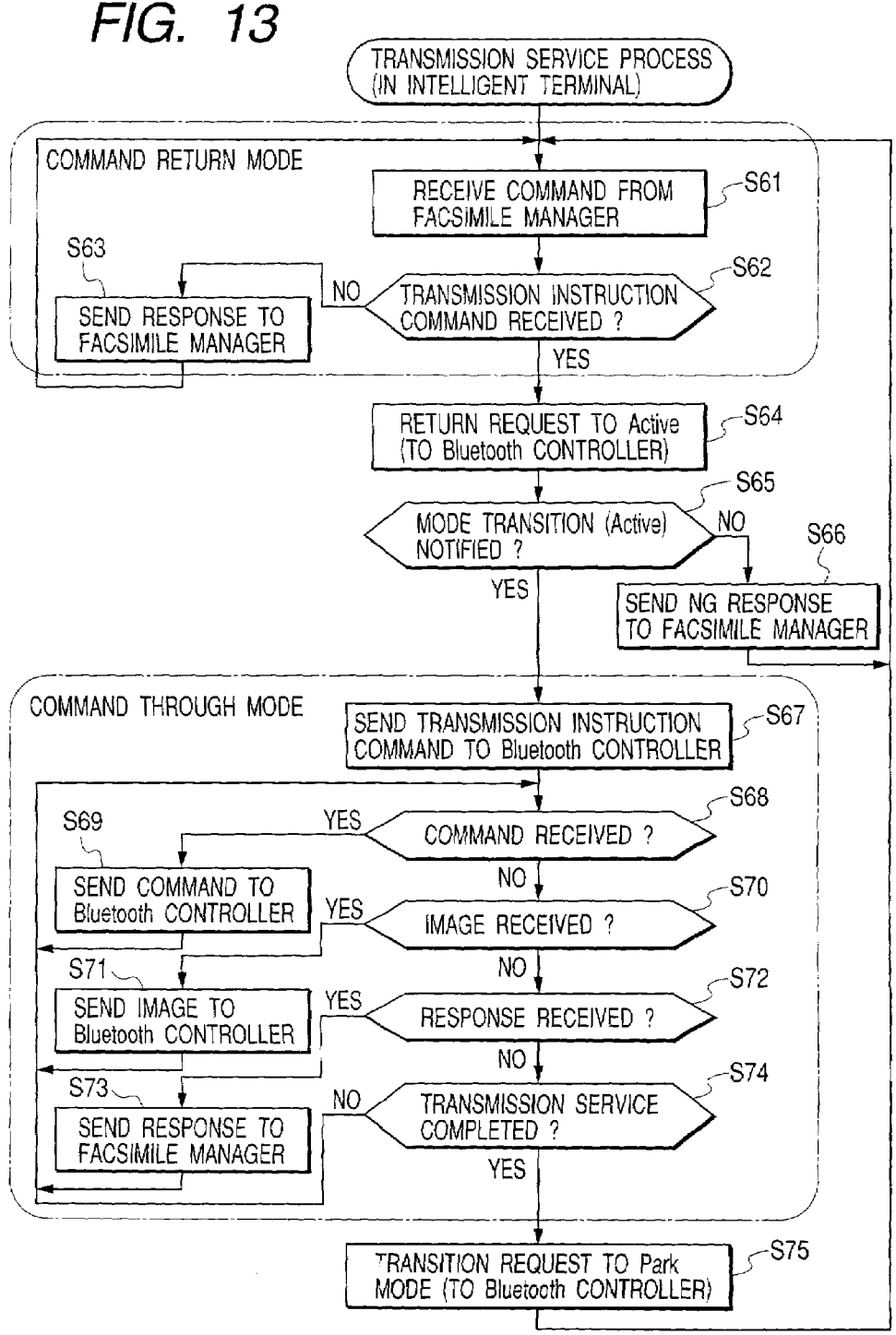

APPARATUS WITH COMMUNICATION FUNCTION, METHOD OF CONTROLLING APPARATUS, AND STORAGE MEDIUM STORING PROGRAM FOR CONTROLLING APPARATUS

BACKGROUND OF THE INVENTION

1. Field of the Invention

The present invention relates to an apparatus having a communication function, a method of controlling the apparatus, and a storage medium storing a program for controlling the apparatus.

2. Related Background Art

A system is known which has an intelligent terminal such as a personal computer connected to a facsimile apparatus via a wired interface such as a bidirectional parallel port (in conformity with IEEE1284), e.g., Centronics and a universal serial bus (USB).

In such a system, the intelligent terminal takes the initiative in the system control and data transfer by sending a command to the facsimile apparatus which returns a response.

Since such a facsimile apparatus is required to return a response to a command sent from the intelligent terminal, the facsimile apparatus connected to the intelligent terminal is controlled so as not to enter a power saving mode.

In the above-described system, since the facsimile apparatus connected to the intelligent terminal is controlled so as not to enter the power saving mode, the power is consumed wastefully.

Further, since a response to a command from the intelligent terminal is always required to be returned, even changing the mode during the stand-by mode has not been taken into consideration.

SUMMARY OF THE INVENTION

It is an object of the invention to efficiently change a mode during a stand-by mode.

It is another object of the invention to make a change in a mode regarding a communication function and a change in a mode during a stand-by mode be related to each other.

In one aspect, the invention is an apparatus having a communication function, comprising first switching means for switching between first and second stand-by modes in a stand-by state, and second switching means for switching between first and second communication modes for the communication function, wherein switching by the first switching means and switching by the second switching means are performed in cooperation with each other.

In another aspect, the invention is a method of controlling an apparatus having a communication function, comprising a first switching step of switching between first and second stand-by modes in a stand-by state, and a second switching step of switching between first and second communication modes for the communication function, wherein switching by the first switching step and switching by the second switching step are performed in cooperation with each other.

In yet another aspect, the invention is a storage medium storing a program for controlling an apparatus having a communication function, the program comprising a first switching step of switching between first and second stand-by modes in a stand-by state, and a second switching step of switching between first and second communication modes for the communication function, wherein switching by the first switching step and switching by the second switching step are performed in cooperation with each other.

Other objects and features of the present invention will become apparent from the following detailed description of the embodiment when read in conjunction with the accompanying drawings.

BRIEF DESCRIPTION OF THE DRAWINGS

FIG. 9 is a flow chart illustrating a power-on process to be executed by a Bluetooth control task of the image processing apparatus shown in FIG. 1.

FIG. 10 is a flow chart illustrating a return process from ESS to be executed by the Bluetooth control task of the image processing apparatus shown in FIG. 1.

FIG. 13 is a flow chart illustrating a transmission service process to be executed by the Bluetooth control task of the intelligent terminal shown in FIG. 3.

DETAILED DESCRIPTION OF THE PREFERRED EMBODIMENTS

An embodiment of the invention will be described in detail with reference to the accompanying drawings.

Figure 1:
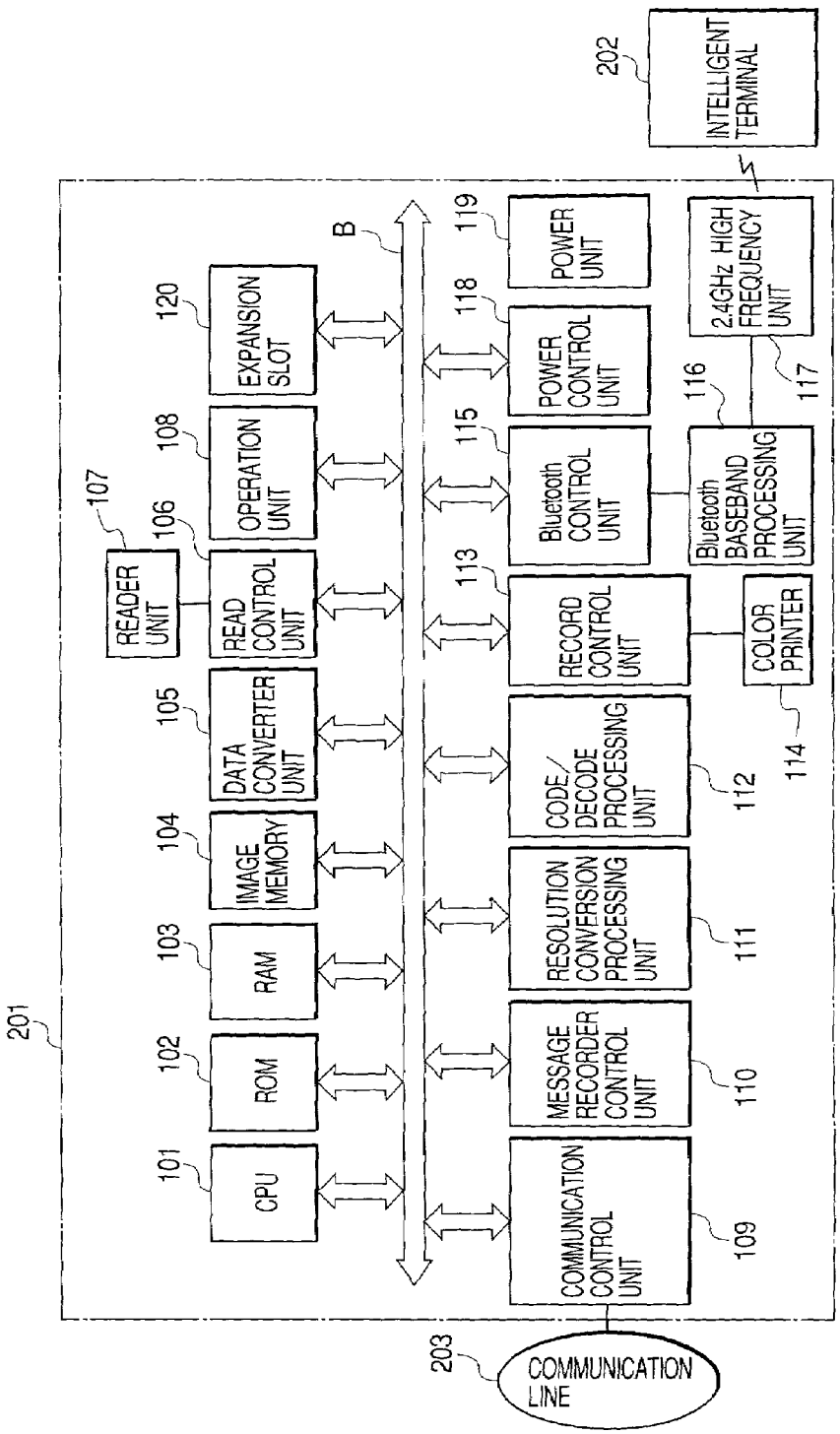
FIG. 1 is a block diagram showing the outline structure of an image processing apparatus constituting an image processing system according to an embodiment of the invention.

FIG. 1 is a block diagram showing the outline structure of an image processing apparatus 201 constituting an image processing system according to an embodiment of the invention. In this embodiment, it is assumed that the image processing apparatus is a facsimile apparatus.

Referring to FIG. 1, a CPU 101 serves as a system control unit and controls the entirety of the image processing apparatus 201. A ROM 102 stores control programs, an operating system (OS) program and the like to be executed by CPU 101. A RAM 103 may be a static RAM (SRAM) or the like and stores program control variables and the like.

RAM 103 also stores setting values, management data of the apparatus 201 and the like registered by an operator, and has various working buffer areas. An image memory 104 may be a dynamic RAM (DRAM) or the like and stores image data. In this embodiment, each control program stored in ROM 102 controls software such as scheduling software and task switching software under the management of OS stored in ROM 102.

An operation unit 108 has various keys, LED's (light emitting diodes), an LCD (liquid crystal display) and the like, and is used for various input operations by an operator, for displaying an operation status of the image processing apparatus 201, and for other purposes.

A read unit 107 optically reads an original with a CS image sensor (tight contact type image sensor) and converts a read signal into electrical image data which is output as an image signal. A read control unit 106 performs various image processing of the image signal, such as a binarizing process and a halftone process to be performed by an unrepresented image processing control unit, and outputs image data of high precision. In this embodiment, the read control unit 106 can perform both a sheet read control of reading an original while it is transported and a book read control of scanning an original placed on an original plate.

A record control unit 113 performs various image processing of image data to be printed by a color printer 114 such as a laser beam printer and an ink jet printer, and outputs image data of high precision to the color printer 114. The image processing such as a smoothing process, a record density correction process and a color correction process is performed by the unrepresented image processing control unit.

A communication control unit 109 is constituted of a modulation/demodulation (MODEM) unit, a network control unit (NCU) and the like. In this embodiment, the communication control unit 109 is connected to an analog communication line (public switched telephone network PSTN) 203, and controls communications by the T30 protocol and the communication line for incoming and outgoing calls. A message recorder control unit 110 is made of a voice IC (integrated circuit), a voice recording/reproducing control unit (not shown) and the like and provides an automatic answering function.

A code/decode processing unit 112 performs a coding/decoding process and a magnification/reduction process of image data to be processed by the image processing apparatus 201. A resolution conversion processing unit 111 converts a resolution of image data, such as a millimeter/inch resolution conversion. The resolution conversion processing unit 111 can also perform a magnification/reduction process of image data. A data converter unit 105 converts image data, for example, for the analysis of page descriptive language (PDL) and the like, and the computer graphics (CG) development of character data.

A Bluetooth control unit 115 controls Bluetooth communications. In accordance with the protocol control in conformity with the Bluetooth specifications, the Bluetooth control unit 115 transmits a packetized command supplied from a Bluetooth control task (refer to FIG. 4 to be described later) to be executed by CPU 101, to a Bluetooth baseband processing unit 116, and receives a packet from the Bluetooth baseband processing unit 116 to convert it into a command and supply it to CPU 101.

The Bluetooth baseband processing unit 116 performs a Bluetooth frequency hopping process and a frame assembly/disassembly process.

A 2.4 GHz high frequency unit 117 transmits/receives radio waves in a 2.4 GHz band used by Bluetooth.

An expansion slot 120 is used for inserting an optional board into this slot of the image processing apparatus 201. In this slot 120, various optional boards can be inserted such as an extended memory, a SCSI (Small Computer System Interface) board and a video interface board.

A power control unit 118 sets this system to a power saving stand-by (ESS) mode, and returns to a normal mode from the ESS mode. The power control unit 118 will be later described with reference to FIG. 2.

A power unit 119 supplies power to the whole of this system including the color printer 114.

An intelligent terminal 202 communicates with the image processing apparatus (facsimile apparatus) 201 in accordance with the Bluetooth specifications.

Figure 2:
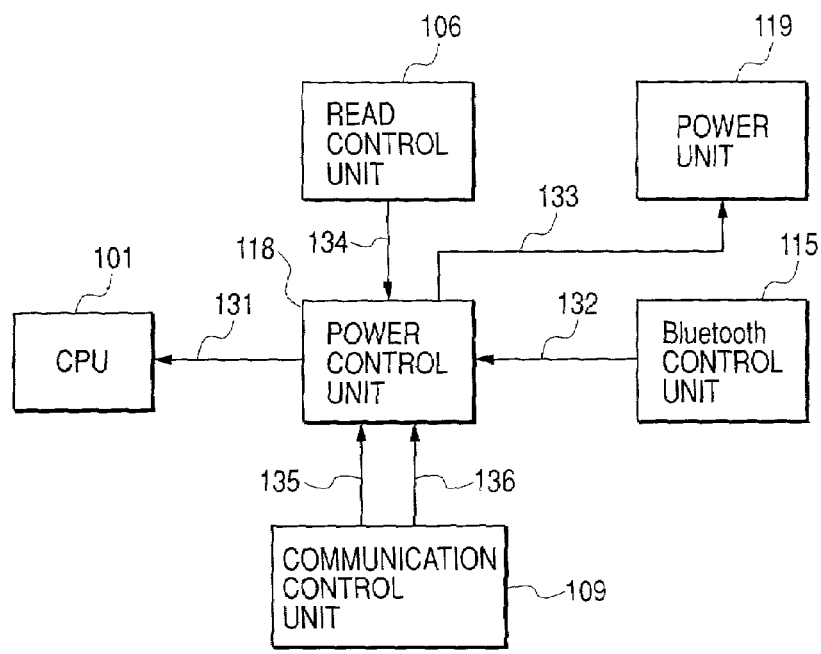
FIG. 2 is a block diagram showing the structure of a power control unit and its peripheral circuit shown in FIG. 1.

FIG. 2 is a block diagram showing the power control unit 118 and its peripheral circuits.

The facsimile apparatus 201 enters a power saving stand-by (ESS) mode if a process such as read, record, communications, and key input is not performed for a predetermined time. When the facsimile apparatus enters the power saving stand-by (ESS) mode, CPU 101 takes a sleep state such as a hold mode, and the power control unit 118 is notified that the operation mode entered the power saving stand-by (ESS) mode.

As to the Bluetooth interface, the facsimile apparatus 201 is made to enter a Park mode which is the power saving mode of Bluetooth, excepting that a command is transferred to and from the Piconet in which the facsimile apparatus 201 is participated. Therefore, while the facsimile apparatus 201 enters the power saving stand-by (ESS) mode, the facsimile apparatus 201 is in the Park mode for the whole Piconet in which it is participated.

When the power control unit 118 is notified that the operation mode entered the power saving stand-by (ESS) mode, it prepares for receiving a signal representative of a factor of returning to the normal mode from the power saving stand-by (ESS) mode, and stops a power supply to the driving system from the power unit 119, by using a control signal 133. In this case, a power supply to the color printer 114 and read unit 107 may also be stopped.

The signal representative of a factor of returning to the normal mode from the power saving stand-by (ESS) mode includes: a signal 134 representative of tat an original to be read is placed on the read unit 107; a signal 135 representative of that an incoming call from the telephone line is received; a signal 136 representative of that the handset is off-hook; as well as a signal 132 from the Bhretooth control unit 115 representative of that the Picoriet in which the facsimile apparatus 201 is participated returned to an "Active mode" from the "Park mode". When sonic key input is entered from the operation unit 108, the normal mode maybe returned from the power saving stand-by (ESS) mode.

When it is detected that the signal representative of the factor of returning to the normal mode from the power saving stand-by (ESS) mode becomes active, the power control unit 118 sends an interrupt signal 131 for making CPU 101 return to the normal mode from the sleep mode, to CPU 101. CPU 101 therefore returns to the normal mode. The power unit 119 releases the power supply stop upon reception of the signal 133.

Figure 3:
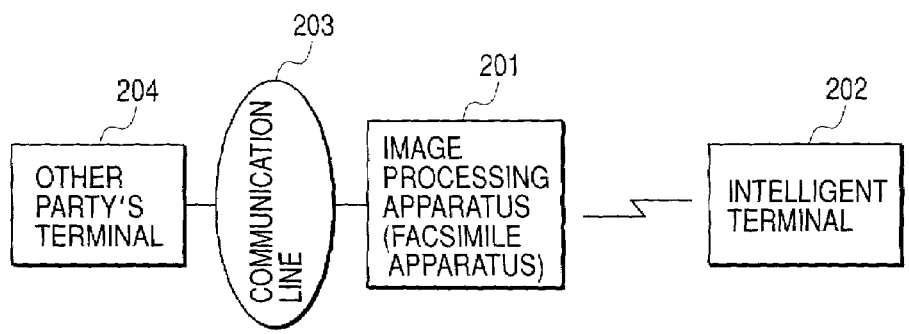
FIG. 3 is a block diagram showing an example of the structure of the image processing system according to the embodiment of the invention.

FIG. 3 is a block diagram showing an example of the structure of an image processing system of the embodiment.

As shown in FIG. 3, the system of the embodiment is constituted of the facsimile apparatus 201 as the image processing apparatus, the intelligent terminal 202, typically a personal computer (PC), the communication line 203, and another party's terminal 204 (e.g., a facsimile apparatus, PC or the like) connected to the communication line 203.

The facsimile apparatus 201 connected to the communication line 203 can perform facsimile communications with the other party's terminal 204. The facsimile apparatus 201 can also be connected to the intelligent terminal 202 over radio waves. In this embodiment, since wireless communications are performed in conformity with Bluetooth, the facsimile apparatus 201 can transfer image data, various data and programs to and from the intelligent terminal 202 if the intelligent terminal 202 has a Bluetooth communications unit or is connected to a Bluetooth communications unit. Also in this embodiment, although the facsimile apparatus is used as the image processing unit 201, the image processing apparatus 201 is not limited only thereto but other image processing apparatuses such as a multi-function apparatus provided with a scanner function and a printer function, an E-mail terminal provided with a scanner function and a printer function may also be used without departing from the scope and spirit of the invention.

Figure 4:
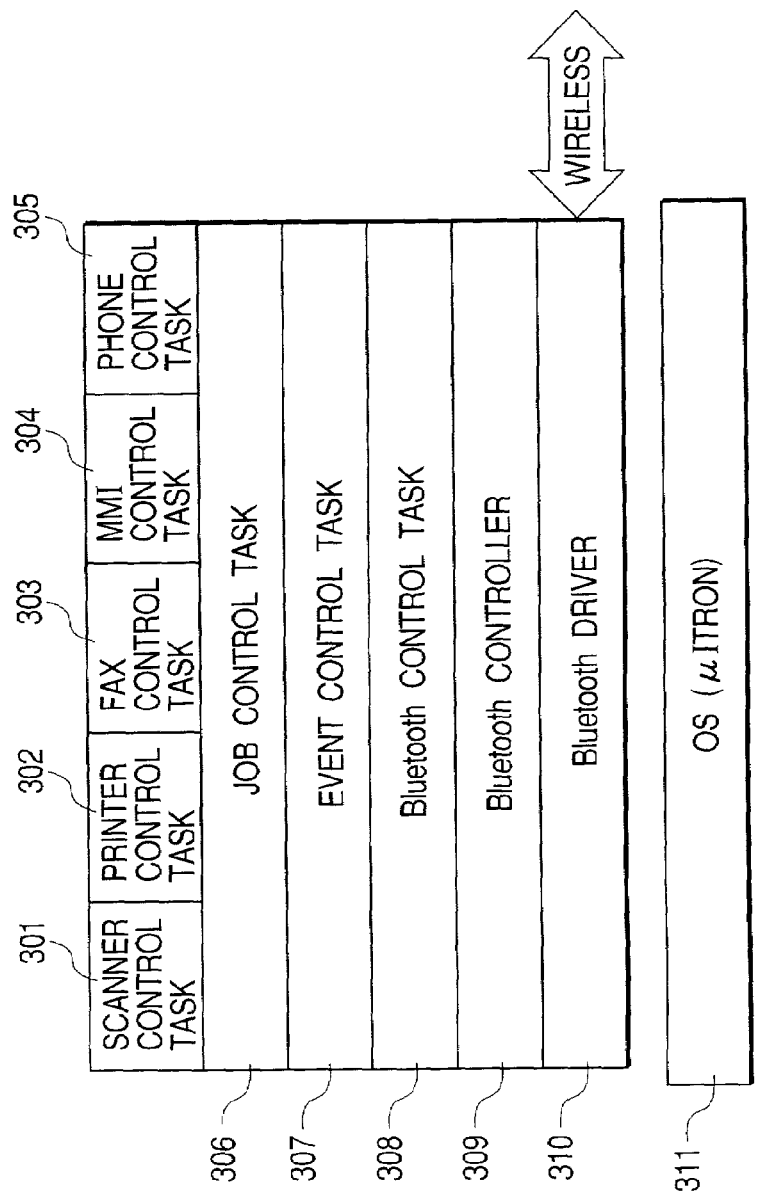
FIG. 4 is a diagram showing an example of the hierarchical structure of control software to be executed by a CPU of the image processing apparatus shown in FIG. 1.

FIG. 4 is a diagram showing an example of the hierarchical structure of control software to be executed by CPU 101 of the facsimile apparatus 201.

As shown in FIG. 4, the uppermost layer of the control software has five control tasks including a scanner control task 301, a printer control task 302, a fax control task 303, an MMI control task 304 and a phone control task 305. Each of the tasks 301 to 305 controls devices of the facsimile apparatus 201 and user operations.

The layer under the uppermost layer has a job control task 306 which analyzes a job supplied from an event control task 307 under this layer, and distributes and queues the analyzed job to the control tasks 301 to 305 of the uppermost layer.

The event control task 307 analyzes an event supplied from a Bluetooth control task 308 at a layer under the event control task layer, and queues a command to a corresponding one of the control tasks 301 to 305 at the uppermost layer.

When information to be transmitted to the intelligent terminal 202 is received from the event control task 307, the Bluetooth control task 308 passes the received information to a Bluetooth controller 309 at the layer under the Bluetooth control task layer. When information to be sent to the upper layer is received at the Bluetooth controller 309, it passes the received information to the event control task 307 at the layer above the Bluetooth control task layer. A mode of transferring such information is called a command through mode.

When information to be transmitted to the intelligent terminal 202 is received from the event control task 307 at the layer above the Bluetooth control task 308 and if this task 308 itself judges that a response can be returned immediately to the upper layer, then the information is not passed to the lower layer but a response is returned to the upper layer. A mode of transferring such information is called a command return mode.

The Bluetooth controller 309 and a Bluetooth driver 310 form a so-called air interface for converting information received from a layer above the Bluetooth controller layer into radio wave information in conformity with the concept of "Generic Access Profile" and its lower level concept of "Serial Port Profile" of Bluetooth. The air interface is well-known techniques so that the description thereof is omitted.

An OS 311 is an embedded-type operating system of the facsimile apparatus 201 and has well-known functions of task switching, event management, memory management and the like for each layer of the control software.

Figure 5:
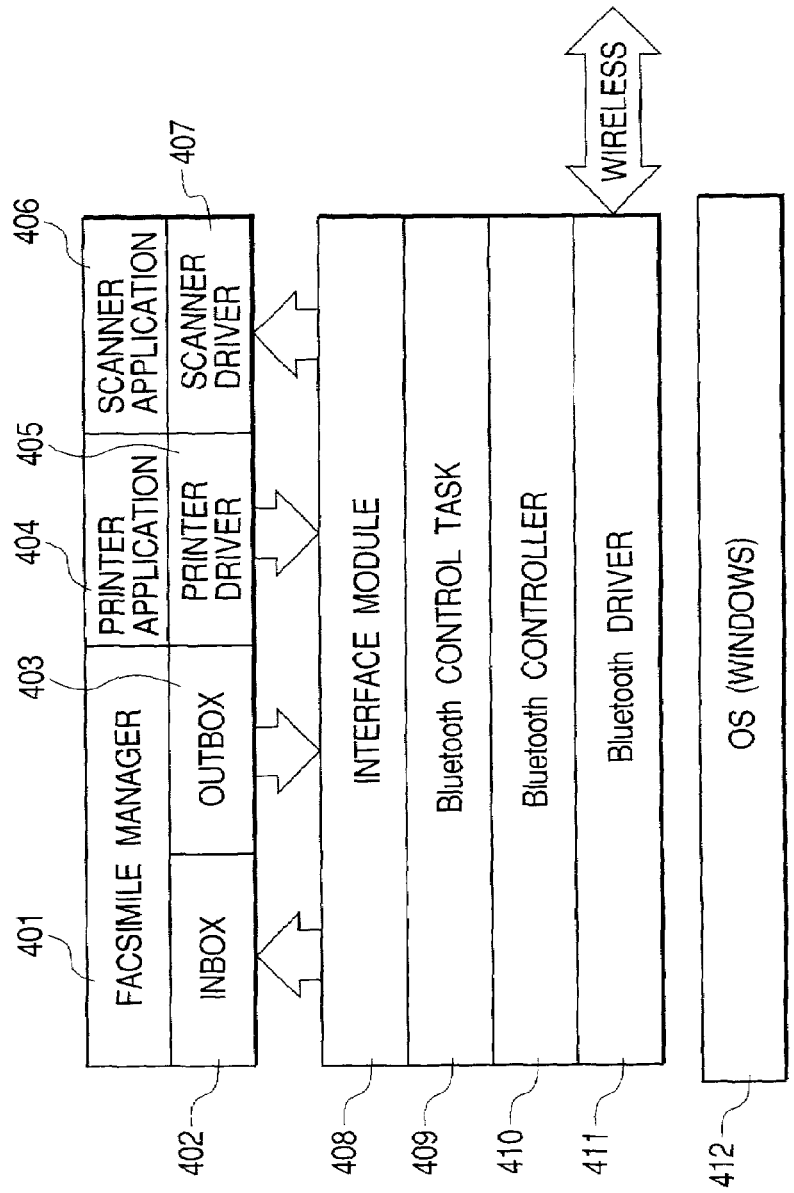
FIG. 5 is a diagram showing an example of the hierarchical structure of control software to be executed by a CPU of an intelligent terminal shown in FIG. 3.

FIG. 5 is a diagram showing an example of the hierarchical structure of control software to be executed by a CPU (not shown) of the intelligent terminal 202.

Referring to FIG. 5, information created by a facsimile manager 401, a printer application 404, a scanner application 406 and the like to be transferred between the intelligent terminal 202 and facsimile apparatus 201 is supplied to an interface module 408 via an inbox 402, an outbox 403, a printer driver 405 and a scanner driver 407. Irrespective of whether control is performed by the facsimile manager 410 or by one of the drivers, the interface module 408 manages a transfer of a file of a facsimile image to be transmitted, an image to be scanned or the like, a read of a received facsimile image, a transfer of a print image, and other operations.

When information to be transmitted to the facsimile apparatus 201 is received from the interface module 408, a Bluetooth control task 409 at a layer under the interface module layer passes the received information to a Bluetooth controller 410 at a layer under the Bluetooth control task layer (an operation in the command through mode).

When information to be transmitted to the facsimile apparatus 201 is received from the interface module 408 at the layer above the Bluetooth control task 409 and if this task 409 itself judges that a response can be returned immediately to the upper layer, then the information is not passed to the lower layer but a response is returned to the upper layer (an operation in the command return mode).

The Bluetooth controller 410 and a Bluetooth driver 411 form a so-called air interface for converting information received from a layer above the Bluetooth controller layer into radio wave information in conformity with the concept of "Generic Access Profile" and its lower level concept of "Serial Port Profile" of Bluetooth.

An OS 412 is an operating system installed in the intelligent terminal 202 and manages each layer of the control software, and the basics of control service of each application.

Figure 6:
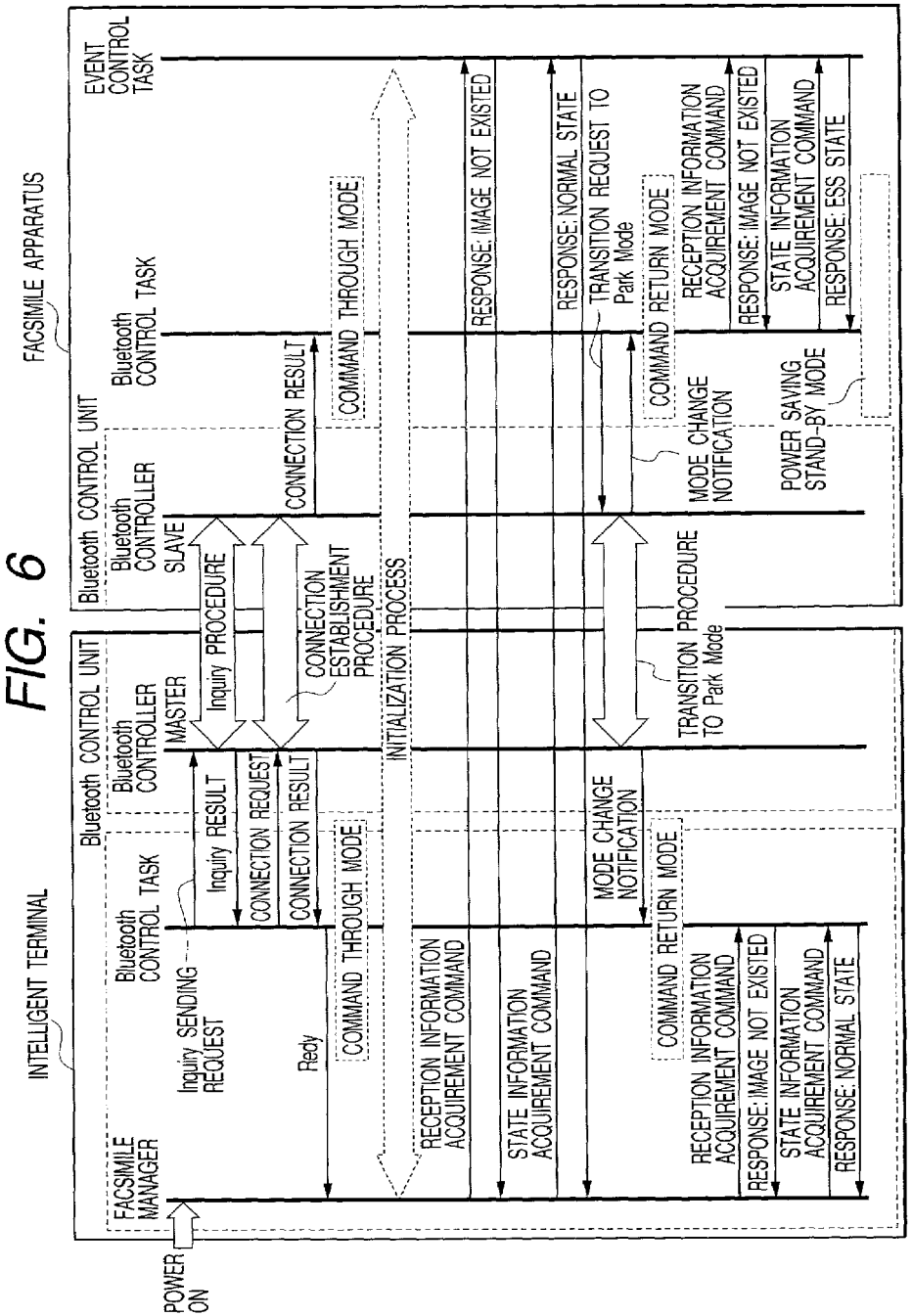
FIG. 6 is a diagram showing a communication flow when the image processing system shown in FIG. 3 starts running.

FIG. 6 is a diagram showing a communication flow between the intelligent terminal 202 and facsimile apparatus 201 when the power of the intelligent terminal 202 is turned on. FIG. 6 shows transitions of each operation state of the apparatus 201 and terminal 202 from their initialization process to entering the stand-by state mode. In this case, it is assumed that the power of the facsimile apparatus 201 has already been turned on.

When the power of the intelligent terminal 202 is turned on, the facsimile manager 401 compatible with Bluetooth is activated to perform a process of connecting the facsimile apparatus 201.

Namely, in order to confirm that the facsimile apparatus 201 to be connected is in the state capable of communications, the Bluetooth control task 409 transmits an inquiry sending request to the Bluetooth controller 410. In this case, "Class of Device" information in the inquiry command is set to "serial communication terminal".

Upon reception of the inquiry sending request, the Bluetooth controller 410 performs an inquiry procedure in accordance with the Bluetooth connection procedure, and notifies the result (inquiry result) to the Bluetooth control task 409. Upon reception of the inquiry result, the Bluetooth control task 409 judges from the contents of the inquiry result whether the facsimile apparatus 201 can be connected. If it can be connected, the Bluetooth control task issues a connection request to the Bluetooth controller 410 by designating the address of the facsimile apparatus 201. If the contents of the inquiry result indicate a connection failure or no facsimile apparatus to be connected, then a message to such effects is displayed on a display unit (not shown) of the intelligent terminal 202.

Upon reception of the connection request, the Bluetooth controller 410 establishes a connection using "Serial Port Profile" of the Bluetooth specifications, relative to the Bluetooth controller 309 of the facsimile apparatus 201. When a connection is established, the Bluetooth controller 410 notifies the connection to the Bluetooth control task 409.

When it is detected from this notice that the connection to the facsimile apparatus 201 was established, the Bluetooth control task 409 transmits a ready signal to the facsimile manager 401, and the operation mode transits to the command through mode in which a command supplied from the facsimile manager 401 is directly passed to the Bluetooth controller 410.

When a message of a connection failure is received, the Bluetooth control task 409 operates to display the message on the display unit of the intelligent terminal 202.

The Bluetooth controller 309 of the facsimile apparatus 201 notifies the result of a connection establishment procedure relative to the intelligent terminal 202 to the Bluetooth control task 308. After the Bluetooth control task 308 confirms the connection establishment from the notified result of the connection establishment procedure, the Bluetooth control task 308 enters the command through mode in which a command from the intelligent terminal is directly passed to the event control task 307, and waits for a command from the intelligent terminal 202. If the connection failed, the Bluetooth control task 308 stands by until a connection is established.

Upon reception of a ready signal from the Bluetooth control task 409, the facsimile manager 401 transmits a command to the Bluetooth control task 409 in order to transfer data such as date information possessed by the intelligent terminal 202 and a name or the like registered in the facsimile manager 401 to the facsimile apparatus 201.

The Bluetooth control task 409 transfers the received command to the Bluetooth controller 410 which transfers the command to the facsimile apparatus 201 by using the "Serial Port Profile".

The Bluetooth controller 309 of the facsimile apparatus 201 sends the command transmitted from the intelligent terminal 202 to the Bluetooth control task 308 which directly passes the command to the event control task 307.

The event control task 307 analyzes the received command and sends the analyzed result to the Bluetooth control task 308.

After the initialization process is completed in the above manner, the facsimile manager 401 issues a reception information acquirement command in order to check whether there is a received image in the facsimile apparatus 201. Upon reception of the reception information acquirement command, the event control task 307 searches image management records stored in RAM 103 to check whether there is a received image. If there is a received image, a response "there is an image" to the reception information acquirement command issued by the Bluetooth control task 308 is returned, whereas if there is no received image, a response "there is no image" is returned.

If the facsimile manager 401 judges from the response to the reception information acquirement command that there is an image, the facsimile manager performs the reception image transfer process shown in FIG. 7 to be described later.

If it is judged that there is no received image, the facsimile manager 401 issues a state information acquirement command in order to store the state of the facsimile apparatus 201. Upon reception of the state information acquirement command, the event control task 307 checks the states of the facsimile apparatus 201 such as a printer state, a scanner state and a memory state, and returns a response of the checked states.

If the facsimile manager 401 judges from the response to the state information acquirement command that the states are in an error state, then it displays the message representative of the error state on the display unit of the information processing apparatus 202, and periodically issues the reception information acquirement command and state information acquirement command to the event control task 307 until the error state is released.

In the case that an image is not received from the communication line for a predetermined time, that there is no service request from the intelligent terminal 202, and that communications are not performed between the facsimile apparatus 201 and intelligent terminal 202 for a predetermined time, and in other cases, it is not necessary to maintain a connection between the intelligent terminal 202 and facsimile apparatus 201 so that the facsimile apparatus 201 makes a connection for Bluetooth communications enter the Park mode which is the power saving stand-by mode.

Namely, the Bluetooth control task 308 of the facsimile apparatus 201 issues a Park mode transition request to the Bluetooth controller 309. Upon reception of the Park mode transition request, the Bluetooth controller 309 together with the Bluetooth controller 410 performs a Park mode transition procedure in accordance with the Bluetooth specifications.

After the transition procedure is completed, the Bluetooth controllers 309 and 410 notify the Park mode transition to the Bluetooth control tasks 308 and 409.

Upon reception of the notice of the Park mode transition, the Bluetooth control tasks 308 and 409 enter the command return mode.

In this embodiment, although the Park mode is selected as the power saving stand-by mode, the power saving stand-by mode is not limited only thereto, but another power saving stand-by mode, either a Sniff mode or a Hold mode, may be selected.

In the command return mode, the Bluetooth control task 409 of the intelligent terminal 202 performs similar processes to those of the event control task 307 of the facsimile apparatus 201 wired by a serial interface such as RS232C or a parallel interface such as Centronics (standard interface stipulated in IEEE1284 or the like). Namely, the Bluetooth control task 409 returns a response to the information acquirement command and reception information acquirement command periodically issued from the facsimile manager 401, in accordance with the facsimile status information stored in a RAM (not shown) of the intelligent terminal 202.

Further, the Bluetooth control task 308 of the facsimile apparatus 201 performs similar processes to those of the facsimile manager 401 of the intelligent terminal 202 wired. Namely, the Bluetooth control task 308 of the facsimile apparatus 201 periodically issues the reception information acquirement command and state information acquirement command to the event control task 307 in order to always monitor the state change of the facsimile apparatus 201 and whether an image is received from another facsimile apparatus via the communication line 203.

In this embodiment, if the facsimile apparatus 201 does not operate for a predetermined time, it enters the power saving stand-by (ESS) mode described with reference to FIG. 2. The event control task 307 returns a response representative of the ESS mode to the state information acquirement command from the Bluetooth control task 308. Upon reception of the response representative of the ESS mode, the Bluetooth control task 308 stops the periodically issued reception information acquirement command and state information acquirement command to allow the facsimile apparatus 201 to transit to the power saving stand-by (ESS) mode. If the normal stand-by mode is returned from the power saving stand-by mode, a return instruction from ESS mode by the event control task 307 is acknowledged by the procedure of FIG. 10 to be described later.

If it is set so that a received image is not transferred to the intelligent terminal 202 when the initialization process is performed or when the intelligent terminal 202 changes the registered data and transfers the changed registered data to the facsimile apparatus 201, then the facsimile manager 401 and the Bluetooth control task 308 of the facsimile apparatus 201 do not issue the reception information acquirement command and state information acquirement command.

Figure 7:
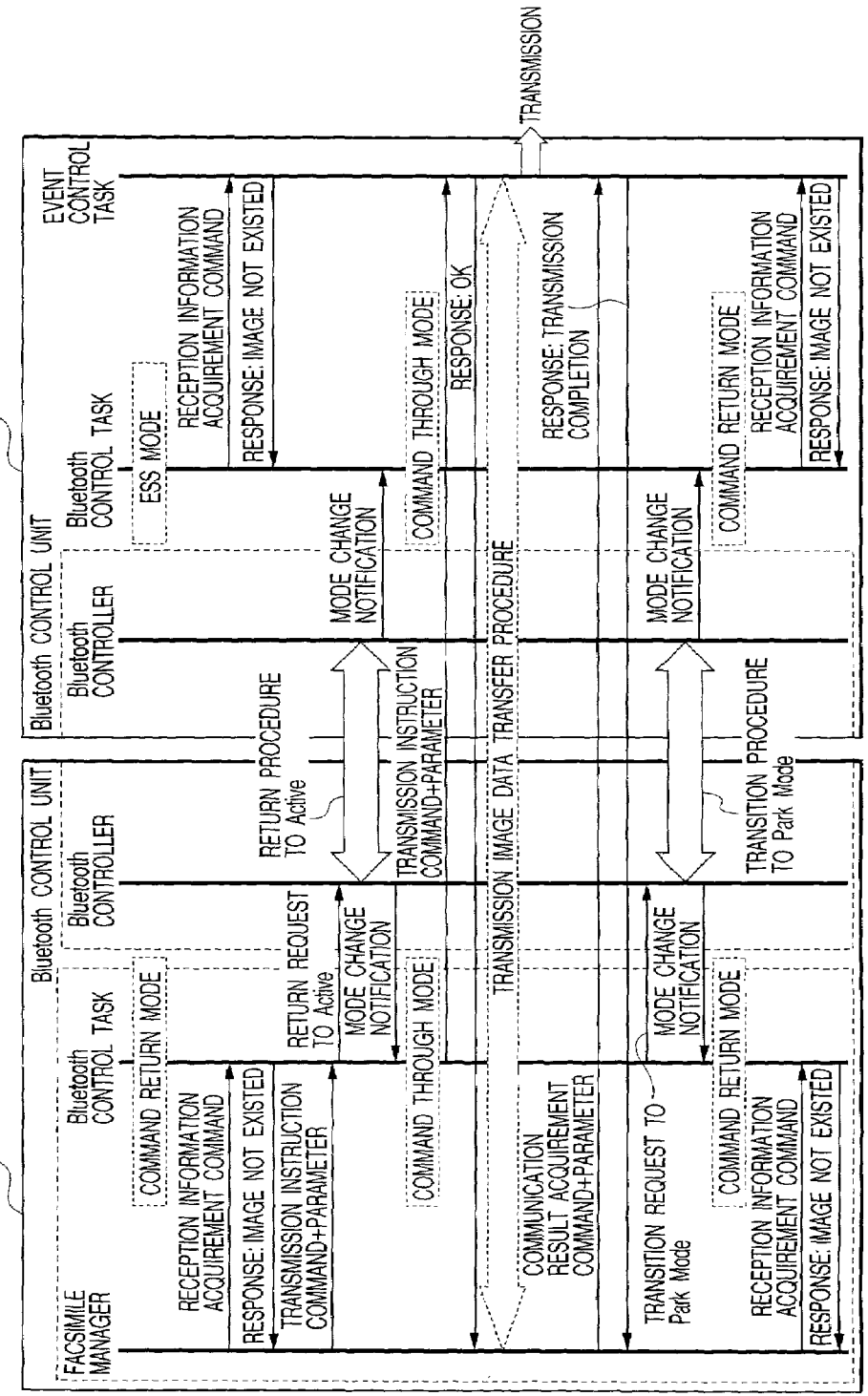
FIG. 7 is a diagram showing a communication flow of the image processing system shown in FIG. 3 when the image processing apparatus transmits an image to the intelligent terminal.

FIG. 7 is a diagram showing the communication flow illustrating a transmission service that image data stored in the intelligent terminal 202 is transferred to the facsimile apparatus 201 and the facsimile apparatus 201 transmits the image data to the designated destination.

In the power saving stand-by (ESS) mode, the Bluetooth control task 308 of the facsimile apparatus 201 does not issue the state information acquirement command, reception information acquirement command or the like.

The Bluetooth control task 409 of the intelligent terminal 202 enters the command return mode in the stand-by state to wait for a response to the state information acquirement command and reception information acquirement command periodically sent from the facsimile manager 401.

When a user selects transmission services at the intelligent terminal 202, the facsimile manager 401 transmits a transmission instruction command and parameters designating a destination phone number to the Bluetooth control task 409.

Upon reception of the transmission instruction command and parameters, the Bluetooth control task 409 recovers communications between the facsimile apparatus 201 and intelligent terminal 202 to provide transmission services.

In order to recover communications, the Bluetooth control task 409 of the intelligent terminal 202 sends an Active return request to the Bluetooth controller 410.

Upon reception of the Active return request, the Bluetooth controller 410 communicates with the Bluetooth controller 309 of the facsimile apparatus 201 in accordance with the Bluetooth communication recovery procedure. Upon recovery of the communications, the Bluetooth controller 410 sends a mode change notification to the Bluetooth control task 409. If the Bluetooth control task 409 received the mode change notification judges from the contents thereof that the communications have recovered, it sends a transmission instruction command to the facsimile apparatus 201 and thereafter the operation mode transits to the command through mode from the command return mode.

If it is judged from the contents of the mode change notification that the communications cannot be recovered, or if there is no response from the Bluetooth controller 410 for a predetermined time or longer, then the Bluetooth control task 409 maintains the command return mode and sends a response "NG" to the facsimile manager 401. Upon reception of the response "NG", the facsimile manager 401 displays a message to the effect that transmission services cannot be provided on the display unit.

Upon reception of the Active return request from the intelligent terminal 202, the Bluetooth controller 309 of the facsimile apparatus 201 activates the signal 132 to the power control unit 118, this signal forming a return factor from ESS in response to the Active return request. Upon reception of this signal, the power control unit 118 sends an interrupt signal to CPU 101 to transit from the sleep mode to the normal mode, and changes the state of the signal 133 to be applied to the power unit 119 to supply again the power which was stopped in the power saving stand-by (ESS) mode.

A mode change notification is issued to the Bluetooth control task 308. If the Bluetooth control task 308 received the mode change notification judges from the contents thereof that the communications have been recovered, the operation mode enters the command through mode to wait for a command from the intelligent terminal 202. If it is judged that the communications cannot be recovered, the operation mode enters the command return mode.

When the communications are recovered, the Bluetooth control task 409 of the intelligent terminal 202 transmits the transmission instruction command and parameters received from the facsimile manager 401 to the facsimile apparatus 201.

The event control task 307 received the transmission instruction and parameters sends a response "OK" to the intelligent terminal if the conditions that the facsimile apparatus 201 does not currently communicate with another apparatus and that the transmission reservation is not full are satisfied, whereas if the conditions are not satisfied, a response "NG" is sent.

Upon reception of the response "OK" from the facsimile apparatus 201, the facsimile manager 401 executes a transmission image data transfer process by using the command interface same as that used by the facsimile apparatus 201 wired by a serial interface such as RS232C or a parallel interface such as Centronics (standard interface stipulated in IEEE1284 or the like). The transmission image data transfer process will be later described with reference to FIG. 8.

After the transmission image data transfer process is completed, the facsimile manager 401 sends a transmission result acquirement command and parameters designating a reception number to the facsimile apparatus 201, in order to know the transmission result. The event control task 307 received the transmission result acquirement command searches the transmission result corresponding to the designated reception number from the image management records stored in RAM 103, and returns a response.

The facsimile manager 401 continues to send the transmission result acquirement command to the facsimile apparatus 201 until the transmission completion is confirmed from the response to the transmission result acquirement command.

If it is confirmed that the transmission is completed, the Bluetooth control task 409 of the intelligent terminal 202 sends a Part mode transition request to the Bluetooth controller 410 in order to transit again to the power saving stand-by Park mode of communications with the facsimile apparatus 201. Upon reception of the Park mode transition request, the Bluetooth controller 410 together with the Bluetooth controller 309 of the facsimile apparatus 201 performs a Park mode transition procedure in accordance with the Bluetooth specifications. After the transition procedure, the Bluetooth controllers 309 and 410 notify the Park mode transition to the Bluetooth control tasks 308 and 409, respectively. Upon reception of the notification of the Park mode transition, the Bluetooth control tasks 308 and 409 transit to the command return mode.

This command return mode continues until a user of the intelligent terminal 202 starts again services such as facsimile transmission, scan and print or the state of the facsimile apparatus 201 changes.

If there is no operation for a predetermined time, the operation mode enters the power saving stand-by (ESS) mode described with reference to FIG. 2. Before the operation mode enters the ESS mode, the event control task 307 returns a response representative of the ESS mode to the state information acquirement command sent from the Bluetooth control task 308. Upon reception of the response representative of the ESS mode, the Bluetooth control task 308 stops an operation of periodically issuing the reception information acquirement command and state information acquirement command so that the facsimile apparatus 201 can enter the ESS mode.

Figure 8:
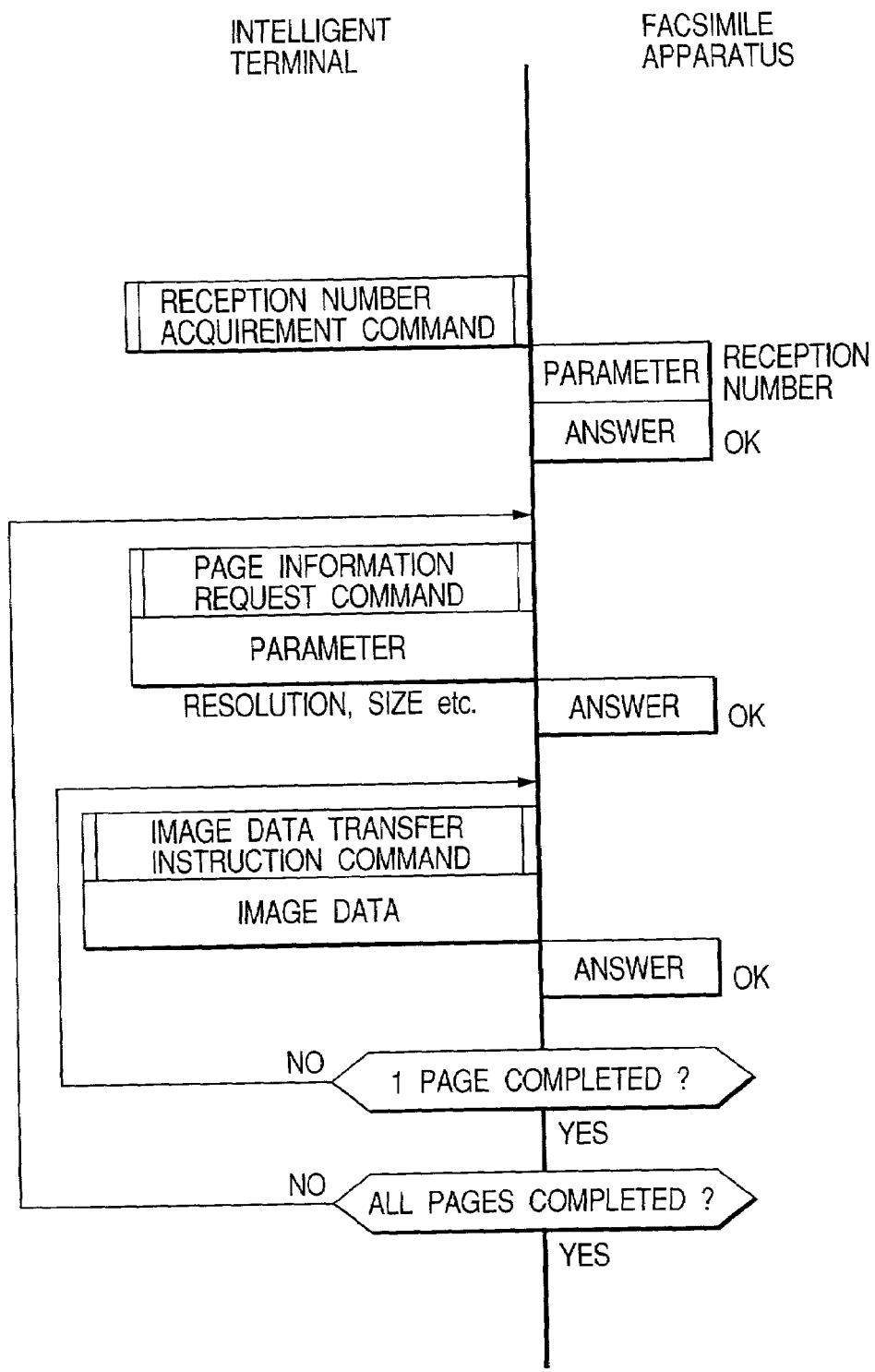
FIG. 8 is a diagram showing a command flow of the image processing system shown in FIG. 3 when the image processing apparatus transmits an image to the intelligent terminal.

FIG. 8 is a schematic diagram showing the outline of command and data transfer between the intelligent terminal 202 and facsimile apparatus 201 during the transmission image data transfer process shown in FIG. 7.

In this process shown in FIG. 8, image data stored in the intelligent terminal 202 is transferred to the facsimile apparatus 201 which facsimile-transmits the image data to the designated destination. In the intelligent terminal 202, the facsimile manager 401 controls this process.

First, the intelligent terminal 202 transmits a reception number acquirement command to the facsimile apparatus 201. Upon reception of the reception number acquirement command, the facsimile apparatus 201 transmits a reception number, assigned when the transmission instruction command was received and stored in RAM 103, together with an answer "OK".

Next, the intelligent terminal 202 transmits a page information request command and parameters designating information such as main/subsidiary resolution, size, etc. of transmission image data. The facsimile apparatus 201 checks from the received parameters whether the transmission image data can be transmitted, and if the transmission image data can be transmitted, the parameters are set to the management information in RAM 103 and an answer "OK" is transmitted to the intelligent terminal 202. If the transmission image data cannot be transmitted, an answer "NG" is transmitted to the intelligent terminal 202.

Upon reception of the answer "OK" to the page information request command, the intelligent terminal 202 transmits an image data transfer instruction command, image data and an image data size to the facsimile apparatus 201.

In response to the image data transfer instruction command, the facsimile apparatus 201 receives the image data, stores it in the image memory 104, and sends back an answer "OK". If the capacity of the image memory 104 is full, after an answer "NG" is sent back, the transmission image data transfer process is terminated.

While the intelligent terminal 202 receives the answer "OK" to the image data transfer instruction command, it transmits image data of one page, whereas if the answer "NG" to the image data transfer instruction command is received, image data transmission is stopped and a transmission service abnormal end is displayed on the display unit.

When the transmission image data of a predetermined amount is stored in the image memory 104, the facsimile apparatus 201 calls the destination phone number designated by the transmission instruction command to perform facsimile transmission. Each time one page facsimile transmission is performed, the corresponding image data in the image memory 104 is erased.

If there is a next transmission page after image data of one page is transmitted, the intelligent terminal 202 transmits again the page information request command to repeat the above-described operations, whereas if there is no next transmission page, the transmission image data transfer process is terminated.

FIG. 9 is a flow chart illustrating a power-on process to be executed by the Bluetooth control task 308 of the facsimile apparatus 201.

When the power of the facsimile apparatus 201 is turned on, the process shown in FIG. 9 is executed and the Bluetooth control task 308 executes an initialization process (Step S1). This initialization process includes a process of setting the operation mode to the command trough mode and a process of setting a variable of existence/not existence of a received image, to be managed by the Bluetooth control task 308.

After the facsimile apparatus 201 executes this process, it waits for the start-up of the intelligence terminal 202.

FIG. 10 is a flow chart illustrating a return process from the power saving stand-by (ESS) mode to be executed by the Bluetooth control task 308 of the facsimile apparatus 201.

When a return factor from the ESS mode is detected by the power control unit 118 and the normal mode is returned from the ESS mode, it is first confirmed at Step S11 whether the return factor is resulted from the Active return request to the Bluetooth controller 309. If the return factor is resulted from the Active return request, it is then checked at Step S14 whether an Active return mode change notification is received. If received, in order to transmit a command from the intelligent terminal 202 to the event control task 307, the operation mode is changed to the command through mode (Step S15). If there is no Active return mode change notification and communications cannot be recovered, the command return mode continues (Step S13).

If it is judged at Step S11 that the return factor from the ESS mode is other than the Active return request, the Bluetooth controller 309 is inquired about the Bluetooth connection state to check whether the Park mode is maintained (Step S12). If maintained, the flow advances to Step S13 whereat the operation mode is set to the command return mode, whereas if not maintained, it is judged that the Piconet was released and the flow advances to Step S16 whereat the Bluetooth control task 308 executes the initialization process to set the operation mode to the command through mode and wait for the start-up of the intelligent terminal 202.

Figure 11:
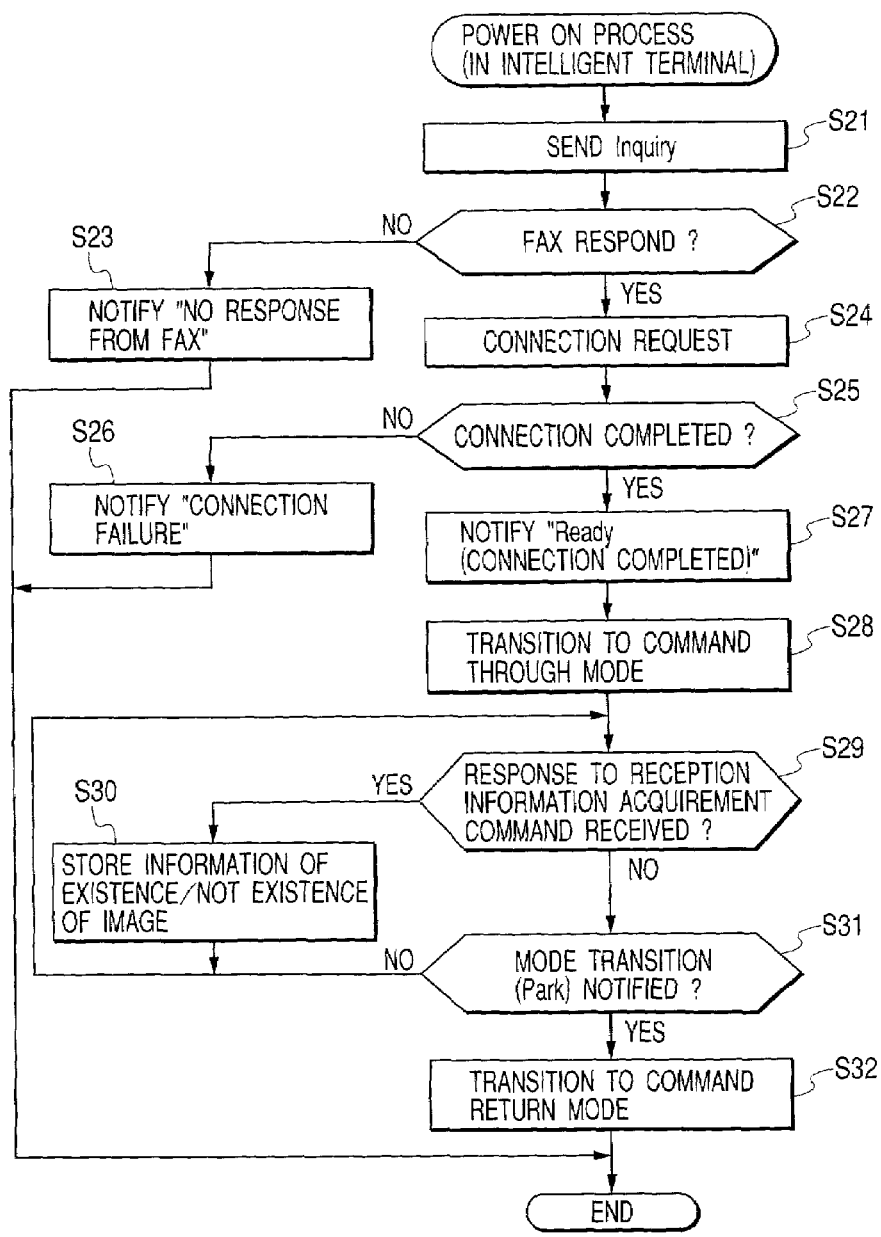
FIG. 11 is a flow chart illustrating a power-on process to be executed by a Bluetooth control task of the intelligent terminal shown in FIG. 3.

FIG. 11 is a flow chart illustrating a power-on process to be executed by the Bluetooth control task 409 of the intelligent terminal 202.

When the power of the intelligent terminal 202 is turned on, the facsimile manager 401 is activated, and at Step S21 the Bluetooth control task 409 sends an "inquiry" to the Bluetooth controller 410.

It is checked at Step S22 whether the facsimile apparatus 201 responds to the sent "inquiry". If normally responded, the flow advances to Step S24, whereas if not responded normally, the flow advances to Step S23.

At Step S23, a message to the effect that there is no connectable facsimile apparatus is displayed on the display unit of the intelligent terminal 202 to thereafter terminate this process.

At Step S24, a connection request is sent to the Bluetooth controller 410 to thereafter advance to Step S25.

At Step S25 a response to the connection request is awaited. When a "connection failure" is notified by the Bluetooth controller 410, the flow advances to Step S26, whereas a "Ready (connection completed) state" is notified, the flow advances to Step S27.

At Step S26, a message to the effect that a connection to the facsimile apparatus 201 failed is displayed on the display unit of the intelligent terminal 202 to thereafter terminate this process.

At Step S27 the Ready state representative of the connection establishment of the facsimile apparatus 201 is notified to the facsimile manager 401 to thereafter advance to Step S28 whereat the operation mode transmits to the command through mode. In the command through mode, when the Bluetooth control task 409 receives a command from the facsimile manager 401, this command is sent to the Bluetooth controller 410, whereas if a command is received from the Bluetooth controller 410, the command is sent to the facsimile manager 401.

Upon reception of the "Ready state", the facsimile manager 401 performs the initialization process between the facsimile manager 401 and the event control task 307 of the facsimile apparatus 201, by using "Serial Prot Profile".

After the initialization process is completed, the facsimile manager 401 periodically sends the reception information acquirement command to monitor whether there is any received image in the facsimile apparatus 201. At Step S29 it is checked whether a response to the reception information acquirement command is received. If received, at Step S30 information of existence/not existence of a received image in the response is stored in the Bluetooth control task 409.

At Step S31 it is judged whether a notification that the operation mode transits to the Park mode under the initiative of the facsimile apparatus 201 is received or not. If not, the flow returns to Step S29 whereat the command through mode continues, whereas if the notification is received, the flow advances to Step S32 whereat the operation mode transits to the command return mode to thereafter terminate the power-on process.

The command return mode of the Bluetooth control task 409 will be later described with reference to FIG. 13.

Figure 12:
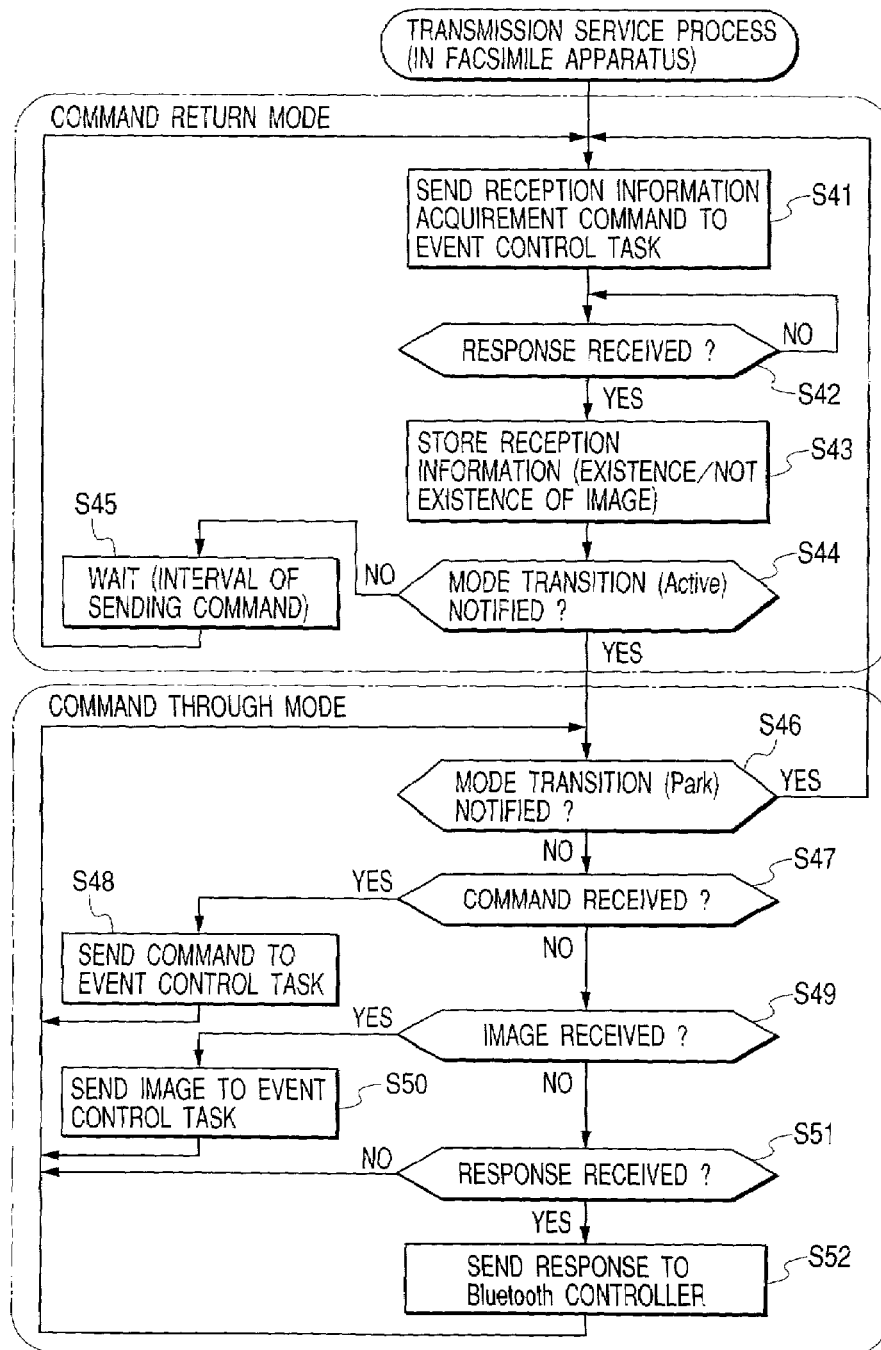
FIG. 12 is a flow chart illustrating a transmission service process to be executed by the Bluetooth control task of the image processing apparatus shown in FIG. 1.

FIG. 12 is a flow chart illustrating a transmission service process to be executed by the Bluetooth control task 308 of the facsimile apparatus 201. It is assumed that the Bluetooth control task 308 enters the command return mode if there is no received image nor the service request from the intelligent terminal 202.

Referring to FIG. 12, at Step S41 the reception information acquirement command is sent to the event control task 307, and at Step S42 a response is received.

When the response is received, at Step S43 the reception information (existence/not existence of a received image) in the response is stored in the Bluetooth control task 308.

At Step S44 it is checked whether the operation mode transits to the Active mode under the initiative of the intelligent terminal 202 and a mode transition notification is received. If not received, the flow advance to Step S45, whereas if received, the flow advances to Step S46 whereat the operation mode transits to the command through mode.

At Step S45 a wait is performed for a predetermined time in order to periodically send a command such as the reception information acquirement command to the event manager, to thereafter return to Step S41.

At Step S46 it is checked whether the operation mode transits to the Park mode under the initiative of the intelligent terminal 202 and a mode transition notification is received. If not received, the flow advance to Step S47, whereas if received, the flow returns to Step S41 whereat the operation mode transits to the command return mode.

At Step S47 it is checked whether a command is received. If received, the flow advances to Step S48 whereat the command is sent to the event control task 307 to thereafter return to Step 46. If not received, the flow advances to Step S49.

At Step S49 it is checked whether an image is received. If received, the flow advances to Step S50 whereat the image is sent to the Bluetooth controller 309 to thereafter return to Step S46. If not received, the flow advances to Step S51.

At Step S51 it is checked whether a response is received. If not received, the flow returns to Step S46, whereas if received, the flow advances to Step S52.

At Step S52, the received response is sent to the Bluetooth controller 309 to thereafter return to Step S46.

FIG. 13 is a flow chart illustrating a transmission service process to be executed by the Bluetooth control task 409 of the intelligent terminal 202. It is assumed that the Bluetooth control task 409 enters the command return mode if there is no received image or if there is no service request command from the facsimile manager 401.

Referring to FIG. 13, at Step S61 it is checked whether a command from the facsimile manager 401 is received. If received, the flow advances to Step S62, whereas if not received, the flow stands by until a command is received.

At Step S62 it is checked whether the command received from the facsimile manager 401 is a transmission instruction command. If the received command is a transmission instruction command, the flow advances to Step S64, whereas if not, the flow advances to Step S63.

At Step S63, in accordance with the received command, a necessary response is returned to the facsimile manager 401 to thereafter return to Step S61 whereat a command from the facsimile manager 401 is awaited.

At Step S64, the transmission instruction command and parameters received from the facsimile manager 401 are stored in the intelligent terminal 202 and the Active return request is sent to the Bluetooth controller 410, to thereafter advance to Step S65.

At Step S65 it is checked whether a mode transition notification is received and the operation mode is returned to the "Active mode". If returned to the "Active mode", the operation mode transits to the command through mode to thereafter advance to Step S67, whereas if not, a response "NG" is returned to the facsimile manager 401 to thereafter return to Step S61 whereat the operation mode transits to the command return mode.

At Step S67 the transmission instruction command and parameters received from the facsimile manager 401 and stored at the intelligent terminal 202 are transmitted to the Bluetooth controller 410 to thereafter advance to Step S68.

At Step S68 it is checked whether a command is received. If received, the flow advances to Step S69 whereat a command is sent to the Bluetooth controller 410, whereas if not received, the flow advances to Step S70.

At Step S70 it is checked whether an image is received. If received, the flow advances to Step S71 whereat the image is sent to the Bluetooth controller 410, whereas if not received, the flow advances to Step S72.

At Step S72, it is checked whether a response is received. If received, the flow advances to Step S73 whereat a response is sent to the facsimile manager 401, whereas if not received, the flow advances to Step S74.

At Step S74 it is checked whether the transmission service is completed. If not completed, the flow returns to Step S68, whereas if completed, the flow advances to Step S75.

At Step S75, a Park mode transition request is sent to the Bluetooth controller 410 to transit to the command return mode and thereafter return to Step S61.

It is obvious that the objects of the invention can be achieved by supplying a storage medium storing software program codes for realizing the function of each embodiment described above to a system or apparatus and by making a computer (CPU or MPU) of the system or apparatus read and execute the program codes stored in the storage medium.

In this case, the software program codes themselves realize the embodiment function. Therefore, the storage medium storing the program codes constitutes the present invention.

The storage medium for storing such program codes may be a floppy disk, a hard disk, an optical disk, a magneto optical disk, a CD-ROM, a CD-R, a magnetic tape, a nonvolatile memory card, a ROM or the like. The program codes may be supplied from a server computer via a communications network.

It is obvious that the scope of the invention includes not only the case wherein the embodiment function is realized by making a computer read and execute the program codes but also the case wherein the embodiment function is realized by making an OS or the like running on a computer execute a portion or the whole of actual processes in accordance with instructions of the program codes.

It is obvious that the scope of the invention also includes the case wherein the functions of each embodiment can be realized by writing the program codes into a memory of a function expansion board inserted into a computer or of a function expansion unit connected to the computer, and thereafter by executing a portion or the whole of actual processes by a CPU of the function expansion board or function expansion unit.

As described so far, according the embodiment, the connection state ("Active mode" in Bluetooth) capable of data transfer between an image processing apparatus and an intelligent terminal is set only when command transfer is necessary therebetween. In the other case, a low power consumption state ("Park mode" in Bluetooth) not capable of data transfer. An increase in the traffic of wireless channels can be suppressed and the power consumption is reduced. In the Park mode, the image processing apparatus enters the power saving stand-by mode to further reduce the power consumption.

When it becomes necessary to transfer data to and from the information processing apparatus, the operation mode transits from the Park mode to the Active mode. Transition to the Active mode makes the image processing apparatus transit from the power saving stand-by mode to the normal mode so that communications with the information processing apparatus can be maintained without interception.

As described above, according to the invention, modes during stand-by can be switched efficiently.

What is claimed is:

1. An apparatus having a communication function, comprising:
   a first switching device adapted to switch between a power save wireless communication mode and an active wireless communication mode;
   a second switching device adapted to switch between a normal stand-by mode and a power save stand-by mode of the apparatus in accordance with the switching by said first switching device;
   a notifying task adapted to notify a state of said apparatus to another apparatus in response to an inquiry from the other apparatus; and
   an execution task adapted to selectively execute a first process of notifying the inquiry from the another apparatus to said notifying task, and a second process of generating an inquiry about the state of said apparatus in place of the inquiry by the other apparatus, and for notifying the generated inquiry to said notifying task in accordance with the switching of communication modes by said first switching device.

2. The apparatus according to claim 1, wherein said first switching device is operable to switch the communication mode when the apparatus starts a communication with the other apparatus by using the communication function.

3. The apparatus according to claim 1, wherein the communication function is a wireless communication function.

4. The apparatus according to claim 1, wherein the active wireless communication mode is an active mode of Bluetooth specifications and the power save wireless communication mode is one of a park mode, a sniff mode and a hold mode of the Bluetooth specifications.

5. The apparatus according to claim 1,
   wherein said second process generates said inquiry in a case where said first switching device switches to the power save wireless communication mode.

6. The apparatus according to claim 5, further comprising:
   a judging device adapted to judge whether switching by said second switching device is performed in response to switching by said first switching device,
   wherein said execution task switches between the first and second processes in accordance with a judgement by said judging device.

7. A method of controlling an apparatus having a communication function, comprising:
   a first switching step of switching between a power save wireless communication mode and an active wireless communication mode;
   a second switching step of switching between a normal stand-by mode and power save stand-by mode of the apparatus in accordance with the switching by said first switching step;
   a notifying step for notifying a state of said apparatus to another apparatus in response to an inquiry from the other apparatus; and
   an execution step of selectively executing a first process of notifying the inquiry from the other apparatus to said notifying step, and a second process of generating an inquiry about the state of the apparatus in place of the inquiry by the other apparatus, and notifying the generated inquiry to the notifying step in accordance with the switching of communication modes by said first switching step.

8. A storage medium storing a program for controlling an apparatus having a communication function, the program comprising:
   a first switching step of switching between a power save wireless communication mode and an active wireless communication mode;

a second switching step of switching between a normal stand-by mode and a power save stand-by mode of the apparatus in accordance with the switching of the first switching step;

a notifying step for notifying a state of said apparatus to another apparatus in response to an inquiry from the other apparatus; and an execution step of selectively executing a first process of notifying the inquiry from the other apparatus to said notifying step, and a second process of generating an inquiry about the state of the apparatus in place of the inquiry by the other apparatus, and notifying the generated inquiry to the notifying step in accordance with the switching of communication modes by said first switching step.

* * * * *